(12) United States Patent
Lauper

(10) Patent No.: US 8,755,778 B2
(45) Date of Patent: *Jun. 17, 2014

(54) METHOD FOR ACCESSING A COMMUNICATIONS SERVICE BY MEANS OF AN ELECTRONIC ADDRESS

(71) Applicant: Swisscom AG, Bern (CH)

(72) Inventor: Eric Lauper, Bern (CH)

(73) Assignee: Swisscom AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,706

(22) Filed: Feb. 26, 2013

(65) Prior Publication Data

US 2013/0171972 A1 Jul. 4, 2013

Related U.S. Application Data

(63) Continuation of application No. 11/513,919, filed on Aug. 31, 2006, now Pat. No. 8,423,001, which is a continuation of application No. PCT/EP2005/050791, filed on Feb. 24, 2005.

(30) Foreign Application Priority Data

| Mar. 3, 2004 | (EP) | 04100864 |
| Mar. 16, 2004 | (EP) | 04101080 |
| Apr. 2, 2004 | (EP) | 04101392 |
| Apr. 5, 2004 | (EP) | 04101406 |

(51) Int. Cl.
*H04M 3/493* (2006.01)

(52) U.S. Cl.
USPC ............. 455/414.2; 455/456.3; 455/405; 455/410; 340/572.3; 705/64

(58) Field of Classification Search
USPC ........... 455/456.3, 414.2, 405–409, 410, 411; 340/572.1; 705/26–27, 64–69
See application file for complete search history.

(56) References Cited

U.S. PATENT DOCUMENTS

| 6,542,933 | B1 | 4/2003 | Durst et al. |
| 6,611,673 | B1 | 8/2003 | Bayley et al. |
| 7,127,261 | B2 | 10/2006 | Van Erlach |
| 7,267,275 | B2 | 9/2007 | Cox, Jr. et al. |

(Continued)

FOREIGN PATENT DOCUMENTS

| EP | 1054335 | 11/2000 |
| EP | 1191448 | 3/2002 |

(Continued)

OTHER PUBLICATIONS

Auto-ID Object Name Service (ONS) 1.0, Auto-ID Center Working Draft Aug. 12, 2003.

*Primary Examiner* — Vladimir Magloire
(74) *Attorney, Agent, or Firm* — McAndrews, Held & Malloy, Ltd.

(57) ABSTRACT

A method and system are disclosed with which a communication user can access a communications service by way of a communications terminal. In this regard, the communications terminal reads an electronic code stored in an RFID element by means of an RFID reader device, and the electronic code is transmitted, after verification, to a service server over a communications network. The service server replies with the electronic page address of a page corresponding to the code and that can be used to determine the electronic address, the electronic address is made available to the communications terminal and said communications service is accessed.

30 Claims, 2 Drawing Sheets

(56) References Cited

U.S. PATENT DOCUMENTS

| | | |
|---|---|---|
| 7,580,678 B2 | 8/2009 | Byman-Kivivuori et al. |
| 2002/0116268 A1 | 8/2002 | Fukuda |
| 2003/0120745 A1 | 6/2003 | Katagishi et al. |
| 2004/0002305 A1 | 1/2004 | Byman-Kivivuori et al. |
| 2004/0203944 A1 | 10/2004 | Huomo et al. |
| 2005/0092825 A1 | 5/2005 | Cox, Jr. et al. |
| 2006/0094411 A1 | 5/2006 | Dupont |
| 2009/0085724 A1 | 4/2009 | Naressi et al. |

FOREIGN PATENT DOCUMENTS

| | | |
|---|---|---|
| JP | 2002077994 | 3/2002 |
| JP | 2002324021 | 11/2002 |
| JP | 2003023666 | 1/2003 |
| WO | 02082363 | 10/2002 |
| WO | 03107146 | 12/2003 |

METHOD FOR ACCESSING A COMMUNICATIONS SERVICE BY MEANS OF AN ELECTRONIC ADDRESS

CLAIM OF PRIORITY

This application is a continuation of U.S. patent application Ser. No. 11/513,919 that was filed on Aug. 31, 2006, which is a continuation of International Application No. PCT/EP05/50791 that was filed on Feb. 24, 2005, and which claims priority of European (EP) applications No. 2004EP-100864 (EP1571590) filed Mar. 3, 2004, No. 2004EP-101080 (EP1577824) filed Mar. 16, 2004, No. 2004EP-101392 (EP1571589) filed Apr. 2, 2004 and No. 2004EP101406 (EP1571562) filed Apr. 5, 2004. Each of the above identified applications is hereby incorporated herein by reference in its entirety.

TECHNICAL FIELD

The present invention concerns a method according to the independent method claim, with which the user of a telecommunication terminal for a telecommunication network can access a telecommunications service by means of an electronic address, and a system according to claim 27.

STATE OF THE ART

Many telecommunications services require an electronic address to be entered. In order to establish a telephone connection, a telephone number must be entered; in order to send an e-mail, the address of the recipient must be typed in. Access to a web page also is made possible over an URL address.

Remembering an electronic address and then typing in the address is tedious and error-prone. Very often, the required addresses are stored in a local or remote directory, for example in a memory area for telephone numbers, or e-mail address, or in a bookmarks managing program for URL.

New addresses must however be inscribed in the directory before they can be used. Many methods are known for automatically reading a new address and storing it in a directory. For example, barcode scanners are known that are capable of reading and processing electronic addresses printed as barcodes. Barcodes are however relatively sparsely distributed for addresses and the maximum feasible length of the address that can be read with ordinary barcode scanners is limited. Long URLs are for example difficult to be used as barcodes.

Scanners are also known that can scan business cards, automatically convert them into text, and store the recognized data in a database. Such text scanners with text recognition program are however relatively expensive and hardly mobile. In particular the optical character recognition (OCR) text recognition is error-prone and requires a lot of storage and computing capacity.

Systems have also already been recommended in which an electronic address is stored in a chip that is read over a contactless interface. Such systems however have the disadvantage that the stored address is hard to update with a RFID writer device and this only if the chip is re-writable. The chip's storage capacity is limited and does not allow addresses to be stored that consist of more bits than the intended maximum number. If an address is changed, all previously distributed chips must be replaced or updated.

So-called ID cards that can also be embodied as a RFID element are known from EP-A2-1 054 335. On these cards, the image of the user (for example of a student) is stored.

U.S. Pat. No. B1-6,611,673 concerns a method wherein an identification code is read by means of a telecommunication terminal of a user and then a telephone number is selected directly or after consultation of a database.

According to an embodiment from document WO-A2-03/107146, a RFID tag is retrieved and the received information is used for accessing a webpage, a mailbox etc.

REPRESENTATION OF THE INVENTION

It is an aim of the present invention to propose a new method and system with which these problems can be solved more efficiently.

In particular, it is an aim of the present invention to propose a new method and system with which the user o a telecommunication network can access a telecommunications service by means of a telecommunication terminal and an electronic address. Possible services include for example establishing a connection with the indicated address, storing an electronic address in a directory, loading an account connected with the SIM card with a money amount (prepaid card or value card that can be debited several time), blocking respectively unblocking functions either in the mobile terminal or in the mobile radio network, a payment transaction with the electronic address, etc.

It is also an aim of the present invention to propose a new method and system with which electronic addresses can be distributed, updated, read and used more efficiently.

It is another aim of the present invention to propose a new method and system with which it is possible for users to use an address independently from the telecommunication system that has been logged into.

These aims are achieved in particular through a method with which a telecommunication user can access a telecommunications service by means of a telecommunication terminal and an electronic address, with the following method steps:

the telecommunication user reads an electronic code stored in a RFID element with a RFID reader device, said electronic code is transmitted over a telecommunication network to a name service-server, said name service-server replies with the electronic page address of a page corresponding to said code and from which said electronic address can be extracted, the desired electronic address is supplied to said telecommunication terminal;

said telecommunication service is accessed, said telecommunications service comprising a payment transaction with the entity to which said electronic address has been allocated.

This has the advantage that the used electronic address is loaded automatically in the telecommunication terminal.

This also has the advantage that the used electronic address is not stored in the RFID element but on a page that can easily be updated at any time, for example by the address owner, and this even after distribution of the RFID elements.

This has furthermore the advantage that the page address of the page from which the desired electronic address is derived can itself be determined from a name service-server and thus can easily be changed without having to inform the users of the RFID elements thereof. This allows for example to host this page on different servers.

The page's page address corresponds to the code read in the RFID element. The connection between the code and the electronic page address is not static but is recorded in a name service-server. This has the advantage that changes of the page address are possible and easily traceable at any time. This also has the advantage that it is a universal system in which services can be ordered from each mobile device in each network over a single address of the server.

The inventive method further has the advantage that the telecommunications service is accessed as soon as the electronic address of said telecommunication terminal has been made available. It is thus possible to determine an electronic address with a RFID reader device and immediately, possibly even without the user intervening, to use it for accessing a service.

This method allows a user, for example a mobile subscriber, to prove that he has a RFID element with which the address of the desired service can be forwarded. Since RFID elements are difficulty to copy and since the electronic address is possibly available only on the downloadable page, the distribution of the electronic address and thus the access to the service can be controlled, which also increases security.

The RFID element can be installed in a tag that can be connected with a product, for example, but not exclusively, with a business card. It is thus possible by reading the code in the tag to determine the telephone number or e-mail address of the person currently responsible for the product's support and automatically establish a connection with this person.

BRIEF DESCRIPTION OF THE FIGURES

The present invention will be described hereinafter in more detail on the basis of the figures, which show.

WAYS OF EXECUTING THE INVENTION

Figure 1:
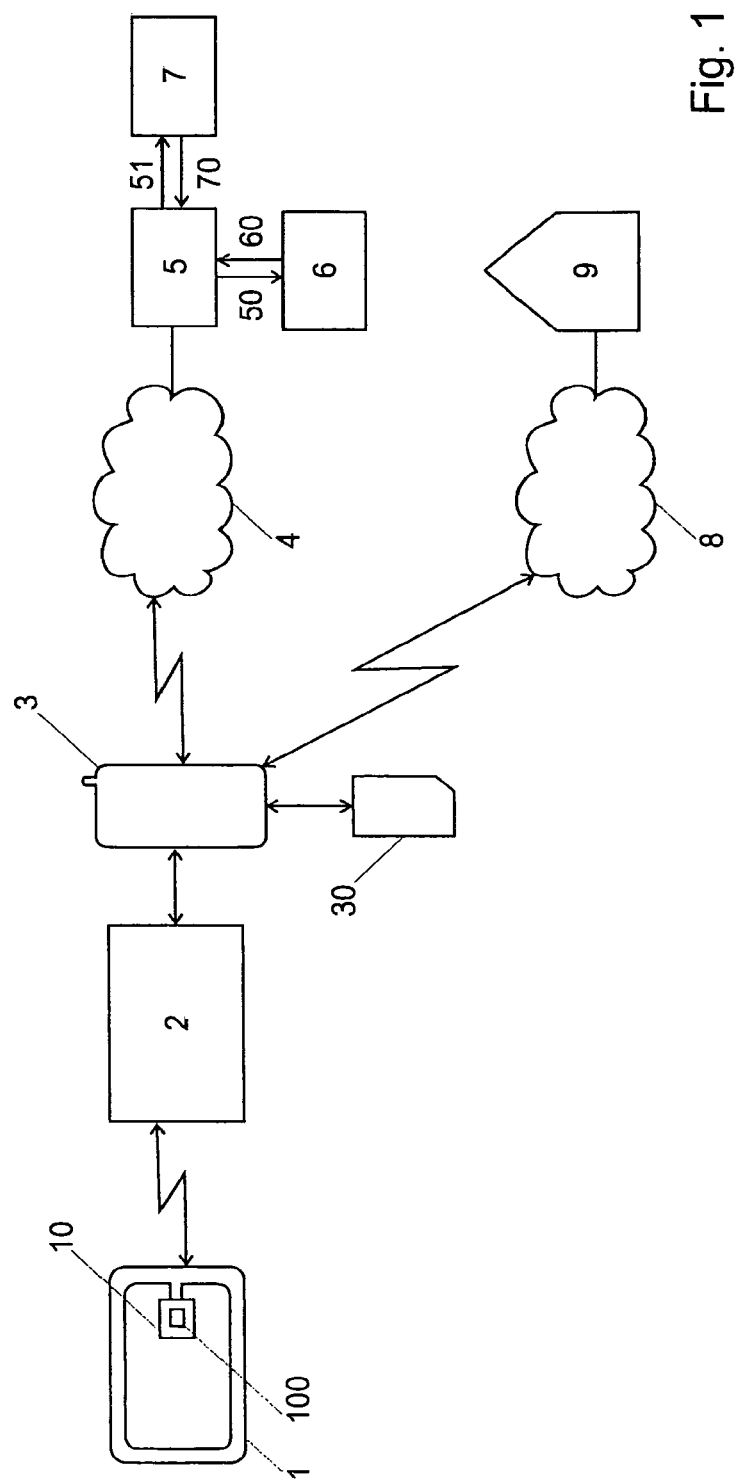
FIG. 1 a block diagram of a system with a mobile device, a RFID reader device and a RFID.

FIG. 1 shows the system that is used by the user (mobile subscriber) to order services with the inventive method. A mobile device 3 (for example a mobile radio telephone or a PDA with an interface for a cellular mobile radio network) can receive from a mobile radio network 4 and send to it short messages (for example SMS and USSD) and data (for example IP packets). The mobile radio network 4 is for example a GSM, GPRS, HSCSD, EDGE, UMTS or CDMA network over which also data can be transmitted. The mobile device 3 includes an identification module (for example a SIM card 30) to identify the device through the network 4. One or several software applications can be executed by a processor in the mobile device 3 and/or in the SIM card 30.

The mobile device 3 further comprises a RFID reader device 2 or is connected with such a reader part (for example over a USB, Firewire, PCCard, CompactFlash, proprietary etc. connection or over a Bluetooth or WLAN contactless connection). The reader device 2 includes a microcontroller and least one antenna or coil for exchanging data with RFID components in the immediate vicinity. The data transmission occurs preferably in the frequency range of 13.56 Mhz, 900 Mhz and/or 860-930 Mhz. The reader part can preferably be chosen to work in different frequency ranges and with different RFIDs. The operational range for reading the RFID is preferably between 2 and 10 meters—depending on the orientation of the reader part and of the RFID element. The connection preferably occurs in half-duplex mode with an ASK backscatter modulation.

The RFID element 1 includes a chip 10 with a non-erasable permanent memory area in which a code 100 is stored during manufacture or during personalization of the chip. The code identifies univocally each particular product; each individual product preferably has another code. Several products can however be marked with the same code 100 if the purpose is to indicate a series of products.

The code preferably cannot be falsified. The code producer (for example a network operator) keeps a table in which the valid, used or expired codes are marked as such.

Figures 2, 3:
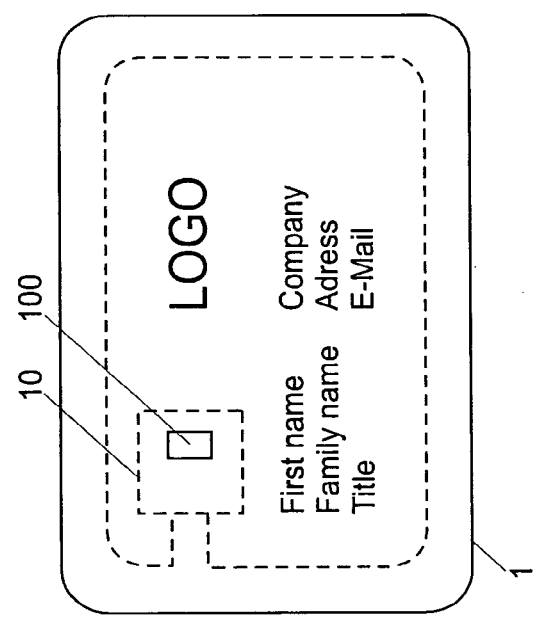
FIG. 2 the structure of a message with a code according to the invention.
FIG. 3 a business card with a RFID element according to the invention.

The codes 100 preferably include 64, 96 or more bits and are organized hierarchically. The answer 1000 of the RFID element 10 to a query of the reader device 2 preferably includes a header 1001, redundant verification data 1002 and only then the code 100 (FIG. 2). Other data can be stored in the memory area of the chip 10 and be read by the reader part.

Codes 100 are preferably distributed by a common authority to different product manufacturers, mobile radio network providers and value added service providers; part of the code 100 preferably indicates the identity of the product provider (for example the identity of the mobile radio network operator). A service provider wishing to offer services to users reserves a series of codes from the common authority and stores part of these codes in the RFID element 1 that are then distributed.

At least one application is provided in the mobile device 3 for reading codes 100 in neighboring RFID elements 1 over the reader device 2 and for sending this code over the mobile radio network 4. Reading a code is preferably initiated by the mobile device 3 and/or by the reader device 2; it is possible for example that the mobile device continuously or periodically searches for neighboring RFID elements and reads, processes or forwards the codes in found RFID elements 1. In another, low-current embodiment, reading is initiated by the user of the mobile device 3 and/or of the reader device 2 that launches a corresponding application or enters a command if he wishes to read a RFID element 1. Reading the RFID element 1 with the mobile device 3 or with another device can also be initiated by an external device (for example a selling point or an automatic machine) over an interface at close range (for example Bluetooth or WLAN) over the mobile radio network 4 or over a link on a visited WEB or WAP page.

Simple filters and processing means can be provided as part of the application in the mobile device 3 and/or in the reader device 2, in order to process read codes 100. The application can for example process and forward only certain code parts. Redundancy checks can also be provided to delete codes that are not plausible or that contain errors. Previously used codes are preferably stored in a database in the mobile device 3 for the purpose of future controls, statistic evaluations and backups.

According to the application, a password or another authentication can also be requested before the code is read or forwarded. The password can for example be printed on a hidden part of the product that can be uncovered, for example a prepaid card or a value card that can be debited several times, or is communicated to the mobile user over another channel. The password verification can for example prevent an unauthorized third party from reading and using codes in someone else's products with a suitable reader device.

In one embodiment, the password consists of part of the code 100 or can be determined from this code with a function. The password can for example result from a signature of the code that can be verified with a public key. In this case, the password can be determined from the code only if the unauthorized third party knows the corresponding function or the private signing key. This embodiment has the advantage that the application can verify the validity of the password merely on the basis of the code.

In another embodiment, the validity of the password is verified on the basis of a table in the SIM card 30, in the mobile device 3 or in the external server.

In yet another embodiment, the password is stored in the RFID element 1 and verified by the RFID element 1. This embodiment requires however expensive RFID elements that can also store, receive and compare passwords.

The application in the mobile device 3 can request a confirmation of the user before the code is processed any further and the desired service is ordered. This confirmation can for example be entered over the keyboard of the mobile device, PDA, over other input means or with a voice command.

If the password is correct and the confirmation is received, the read code 100 is packaged in a service order message (for example in a short message or preferably in a GPRS or UMTS packet) and sent over the mobile radio network 4 to a server 5 at a known address, preferably a server within the infrastructure of the mobile radio network 4. The service order message is optionally signed and/or provided with a time stamp by the mobile device 3 or by the SIM card 30.

The server 5 administers service order messages with codes that are received from several or possibly all RFID readers 2. Other, more complex filters can be provided in the server 5 in order to handle codes from different areas differently or not at all.

A password can also be required by the server 5 for the code to be processed at all; like in the mobile device, this password can bee derived from the code itself or be verified on the basis of a table. The password is for example transmitted to the server 5 in a message together with the code 100.

The server 5 can also verify the identity of the user. This is all the more reliable if the server 5 is administered by the operator of the mobile radio network 4. In this case, the identity of the mobile user can be determined reliably for example on the basis of the IMSI (International Mobile Subscriber Identity) or of another identity in the SIM card 30. Certain services are supplied only to certain users (for example mobile users having a corresponding subscription, having a sufficient balance on a money account, or whose profile allows the supplying of the service).

If the password is wrong or if the desired service cannot be made available for any other reason, a message is preferably sent to the user (for example over SMS, USSD or Internet). After several failed attempts, further attempts can be blocked definitively or temporarily for security reasons. In this manner, it is possible to prevent that valid codes can be guessed through repeated attempts.

The server 5 is connected over Internet or an intranet with a name service-server 6 in which for each code a corresponding electronic address of an electronic page is stored.

A query 50 with the code 100 just received is directed by the server 5 to the name service-server 6, which answers with the corresponding electronic page address (answer 60). This page address consists for example of an URL or another address for a TCP-IP network.

The name service-server 6 can be administered by the operator of the server 5 and/or by external entities (for example by the organization distributing the codes 100 to the different companies). Several name service-servers can be connected with one another so that the desired address is sought in another name service-server if it is not found in the server 6. This allows for example a mobile radio network operator to process also codes from other organizations. A local cache of an external name service can also be provided in the server 5 or in the domain of the server 5.

The user of the mobile device 3 can thus always send all codes 100 of all service providers to the same target server 5 that determines from the name service-server 6 or from the network of name service-servers 6 the address of the page on the basis of which the desired service is made available. Processing the service order message thus depends only on the code in the message. Similar messages that reach different servers 5 of several service providers can thus cause exact same electronic address to be made available.

The connection in the name service-server 6 between a code 100 and a page address can preferably be modified anytime by the owner of the page address, for example by the manufacturer of the product with the RFID element 1 (for example over a dedicated WEB form). This allows the electronic page address of a page or of a domain to change without having to inform the end users.

The page address of the desired page can thus be found only and univocally on the basis of the 64 or 96 bits codes stored in the RFID element 1; the page that is accessed is thus completely independent from the address or telephone number of the server 5. Since many products must be marked, and since for security reasons not all codes can be used, enough freely available bits must be provided for the codes; simple IP numbers for example would possibly not suffice since very many possible combinations have already been allocated. Another, independent page addressing system is preferably used.

The server 5 receives the answer 60 from the name service-server 6 with the desired page address and accesses the corresponding page in the server 7 or a network with several local or remote servers (query 51 and answer 70 in FIG. 1).

In one embodiment, the address of the desired page results from a combination of the address indicated by the name service-server 6 with one or several bits of the code 100. In this case, the address in the name service-server 6 corresponds to an area in which the individual pages correspond to certain parts of the code. This has the advantage that the name service-server 6 can be designed more easily.

In one embodiment, the page in the server 7 accessed by the server 5 includes only a field with the desired electronic address that is transmitted to the mobile device 3.

In a preferred embodiment, the page in the server 7 includes a hypertext content in a markup language. In one embodiment, this page comprises an XML (extended Markup Language) content. In another embodiment, the page includes a PML (Product Marking Language) content. At least one field indicated with a markup tag on the page contains the desired address; several addresses in one or several fields with tags can be present on a page.

The page can also support SOAP protocol (Simple Object Access Protocol), .NET Framework or other web services with which the server 5 and finally the mobile device 3 can access the desired data and objects. These data and objects made available with the WEB service contain in this case the desired electronic address or the desired electronic addresses.

The page on the server 7 can also include remote-downloadable computer objects containing data and a corresponding program element. The codes available in the object include in this case the desired electronic address or addresses. The program element can be executed by the mobile device 3 to administer these electronic addresses. The program element can for example execute a dialogue program element with which one of several offered electronic addresses and communication channels can be selected. In a preferred embodiment, the program element contains java applets or program portions executable by a Symbian operating system.

The server 5 downloads the desired page from the server 7 and/or accesses the desired content or part of this content. The page resp. the content is transmitted over the mobile radio network 4 to the mobile device 3.

The mobile device 3 receives the page downloadable from the server 7 with one or several electronic addresses or with an object in which this address is contained. The electronic address is then extracted from the page or from the object, for example with an .XML or .PML browner or parser or with a program or applet contained in the object.

In a first embodiment, a telecommunication service is made available with this address automatically (without intervention of the user). It is for example possible that this electronic address is stored automatically in the address directory of the mobile device 3 or of the SIM card 30 and/or that a connection is automatically established over the telecommunication network 8 with the terminal 9 to this target address. Depending on the type of address, the telecommunication network 8 can be a switched network, for example a mobile or fixed voice or data network, for example a cellular mobile radio network or the Internet.

The connection preferably depends on the type of address; if the address corresponds to a telephone number, a telephone connection is established automatically or after confirmation. If this address corresponds to an e-mail address, an e-mail is prepared that can possibly contain also a standard content (that is downloaded from the page in the server 7), for example for automatically ordering a product or effecting a payment transaction with this address. The electronic address can also correspond to the URL of a WEB or WAP page that will cause this page to be displayed with a corresponding browser.

In another embodiment, the telecommunication service is made available with the determined electronic address only after the user's intervention. In the simplest case, the user's intervention consists only in a confirmation after a message of invitation. In another embodiment, the user is invited to select a certain communication channel in order to decide for example whether a facsimile or telephone connection is to be established in case this is not clear from the downloadable XML content. It is also possible that the user indicates which from among several addresses of the same (or of different) particular type available on a page he wishes to use, which telecommunication service he wishes to call upon and which content or which parameters he uses for this service.

It is also possible within the frame of the invention that the electronic address sent to the mobile device 3 includes an electronic key or a certificate. This key can be used for example for proving the identity of the user of the mobile device or to prove that he has a certain token; it can be used for clearing other services (for example over a contactless interface at close range) in a local network or with remote devices.

FIG. 3 shows an embodiment of the invention in which the RFID element 1 is installed in a business card. This electronic business card can be read by a mobile device 3 in order to be able to access a page in the server 7 from which all the parameters of the RFID element 1 of the business card can be downloaded. An automatic telephone connection with the number printed on the card is possible by merely reading the RFID element 1.

The desired address downloadable from the page in the server 7 is preferably printed on the product, possibly with an indication or a logo. It is for example possible for a special logo to be next to a telephone number on the business card or on a product so that the user knows that he can automatically dial this telephone number by reading and sending the code in the chip 10 in the product.

The inventive method can be used with advantage for determining, downloading and using more easily the e-mail address, the telephone number, the fax number and/or the WEB address of the support service for a product. Since the codes 100 in the RFID element 1 designate each individual product of a particular type individually, it is possible to allocate another electronic address for each user and purchaser of a same product; this address can depend on the date of purchase, the warranty expiration date, the date of acquisition, valid support contract, user language, user profile, previous history and interventions with this product etc. These electronic addresses are furthermore on a page in a server 7 that can possibly be administered by the product manufacturer, so that they can be changed at any time. The address of the page in the server 7 can also be modified at any time by a simple change in the name service-server. The method thus allows the users to determine and use an individual and current electronic address of the support staff person in charge.

Reference List

1 RFID element
10 Chip
100 Code
1000 Answer
1001 Header
1002 Verification data
2 RFID reader device
3 Mobile device
4 Mobile radio network
5 Server
50 Query
51 Query
6 Name service-server
60 Answer
7 Server
70 Answer
8 Telecommunication network
9 Terminal

What is claimed:

1. A method, comprising:
    accepting by a communication terminal, a password from a user for authenticating the user, wherein:
        the password comprises a portion of an electronic code that is embedded in an RFID element, or is derived therefrom,
        the electronic code is associated with an electronic page,
        the electronic page is associated with an electronic address, an
        the electronic address is associated with a communication service;
    verifying the password by the communication terminal; and
    when the password is verified, transmitting by the communication terminal, the electronic code to a service server that is configured to reply with the electronic address of the electronic page corresponding to the electronic code.

2. The method of claim 1, comprising continuously searching by communication terminal for RFID elements at close range.

3. The method of claim 1, comprising reading the electronic code by communication terminal from the RFID element using an RFID reader device connected to or integrated in the communication terminal.

4. The method of claim 1, comprising transmitting the electronic code by the communication terminal to a communication server that is located in infrastructure of a communication network, wherein the communication server is configured to transmit the electronic code to the service server.

5. The method of claim 4, wherein the service server is located outside the infrastructure of the communication network and is accessible to several network operators.

6. The method of claim 1, wherein the electronic page comprises hypertext content in markup language.

7. The method of claim 1, wherein the electronic page comprises only the electronic address.

8. The method of claim 1, wherein the electronic address corresponds to a target terminal in a switched network or in a packet-oriented network.

9. The method of claim 1, wherein the electronic address comprises a telephone number or facsimile number.

10. The method of claim 1, wherein the communication service comprises establishing a connection between the communication terminal and a target terminal based on the electronic address.

11. The method of claim 1, wherein the communication service is accessed only after confirmation of the user after the electronic code has been read.

12. The method of claim 11, comprising inviting by the communication terminal, using a software application, the user to enter the confirmation.

13. The method of claim 12, wherein the software application invites the user to select one from a plurality of possible communication services with the electronic address.

14. The method of claim 12, wherein the software application invites the user to select one from a plurality of available electronic addresses.

15. The method of claim 12, wherein the electronic address is packed in an object that also comprises a program for accessing the communication service.

16. The method of claim 1, wherein each the electronic code is initiated on the manual initiative of the communication user.

17. The method of claim 1, wherein the password is derived from a signature using the electronic code based on a public key.

18. The method of claim 1, wherein the password must be received prior to using the electronic code.

19. The method of claim 1, comprising transmitting by the communication terminal only a portion of the electronic code.

20. The method of claim 1, comprising applying by the communication terminal, a redundancy check to the electronic code to check for errors.

21. A system, comprising:
a communication terminal that is operable to:
accept a password from a user for authenticating the user, wherein:
the password comprises a portion of an electronic code that is embedded in an RFID element, or is derived therefrom,
the electronic code is associated with an electronic page, the electronic page is associated with an electronic address, and
the electronic address is associated with a communication service;
verify the password by the communication terminal; and
when the password is verified, transmit the electronic code to a service server that is configured to reply with the electronic address of the electronic page corresponding to the electronic code.

22. The system of claim 21, wherein the electronic address is printed on the product.

23. The system of claim 21, wherein the communication terminal is operable to continuously search for RFID elements at close range.

24. The system of claim 21, wherein the communication terminal is operable to read the electronic code from the RFID element using an RFID reader device connected to or integrated in the communication terminal.

25. The system of claim 21, wherein the communication terminal is operable to apply a redundancy check to the electronic code to check for electronic code errors.

26. The system of claim 21, wherein the communication terminal is operable to transmit the electronic code by the communication terminal to a communication server that is located in infrastructure of a communication network, wherein the communication server is configured to transmit the electronic code to the service server.

27. The system of claim 26, wherein the communication server is operable to transmit the electronic code to the service server.

28. The system of claim 26, wherein the service server is located outside the infrastructure of the communication network and is accessible to several network operators.

29. The system of claim 26, wherein the password must be received by the communication server prior to the communication server utilizing the electronic code.

30. The system of claim 25, wherein the communication server is operable to send only a portion of the electronic code to the communication server by an application executing on the mobile device or the RFID reader.

\* \* \* \* \*